(12) United States Patent
Robichaud

(10) Patent No.: US 6,918,203 B2
(45) Date of Patent: Jul. 19, 2005

(54) FOOT OPERATED FISHING NET TIPPER

(76) Inventor: Perry Robichaud, 4827 Hwy 69 N, Val Therese, Ontario (CA) P3P 1S7

( * ) Notice: Subject to any disclaimer, the term of this patent is extended or adjusted under 35 U.S.C. 154(b) by 0 days.

(21) Appl. No.: 10/662,071

(22) Filed: Sep. 15, 2003

(65) Prior Publication Data

US 2005/0055864 A1  Mar. 17, 2005

(51) Int. Cl.[7] .............................................. A01K 79/00
(52) U.S. Cl. ..................... 43/8; 43/6.5; 43/11; 114/255
(58) Field of Search ....................... 43/8, 11, 6.5, 19.2; 114/255; 248/514, 517, 519

(56) References Cited

U.S. PATENT DOCUMENTS

| | | | | |
|---|---|---|---|---|
| 562,195 A | * | 6/1896 | Plath .............................. | 43/15 |
| 2,548,038 A | * | 4/1951 | Moliskey ..................... | 212/261 |
| 3,126,180 A | * | 3/1964 | Mandolare .................. | 248/514 |
| 3,191,266 A | * | 6/1965 | Breneman ..................... | 29/525 |
| 4,894,943 A | * | 1/1990 | Allen et al. ................... | 43/6.5 |
| 5,020,464 A | * | 6/1991 | Rodrigues ................... | 114/255 |

* cited by examiner

*Primary Examiner*—Kurt Rowan
(74) *Attorney, Agent, or Firm*—Mike M. Gauthier

(57) ABSTRACT

The present invention relates to a foot operated fishing net tipping apparatus releasably attached to a fishing boat comprising: a boat-attaching portion, a net-holding portion, a lock portion, a foot pedal portion and connecting members. A conventional fishing net is therefore frictionally attached within an opening of the net-attaching portion, which rotably pivots atop the boat-attaching portion. A foot pedal is linked to the net-attaching portion as such to allow the pedal's motion to be transferred to the net-attaching portion. A fisherman can raise and lower the fishing net with one foot, thereby freeing both hands for the fishing rod.

7 Claims, 4 Drawing Sheets

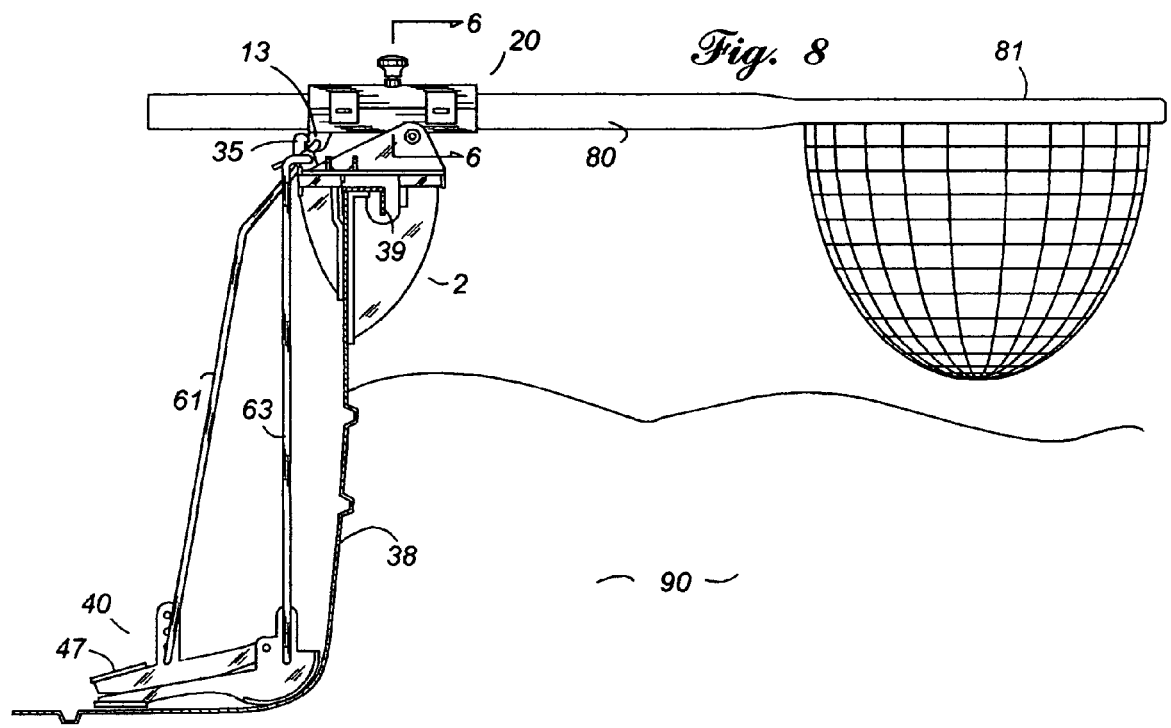
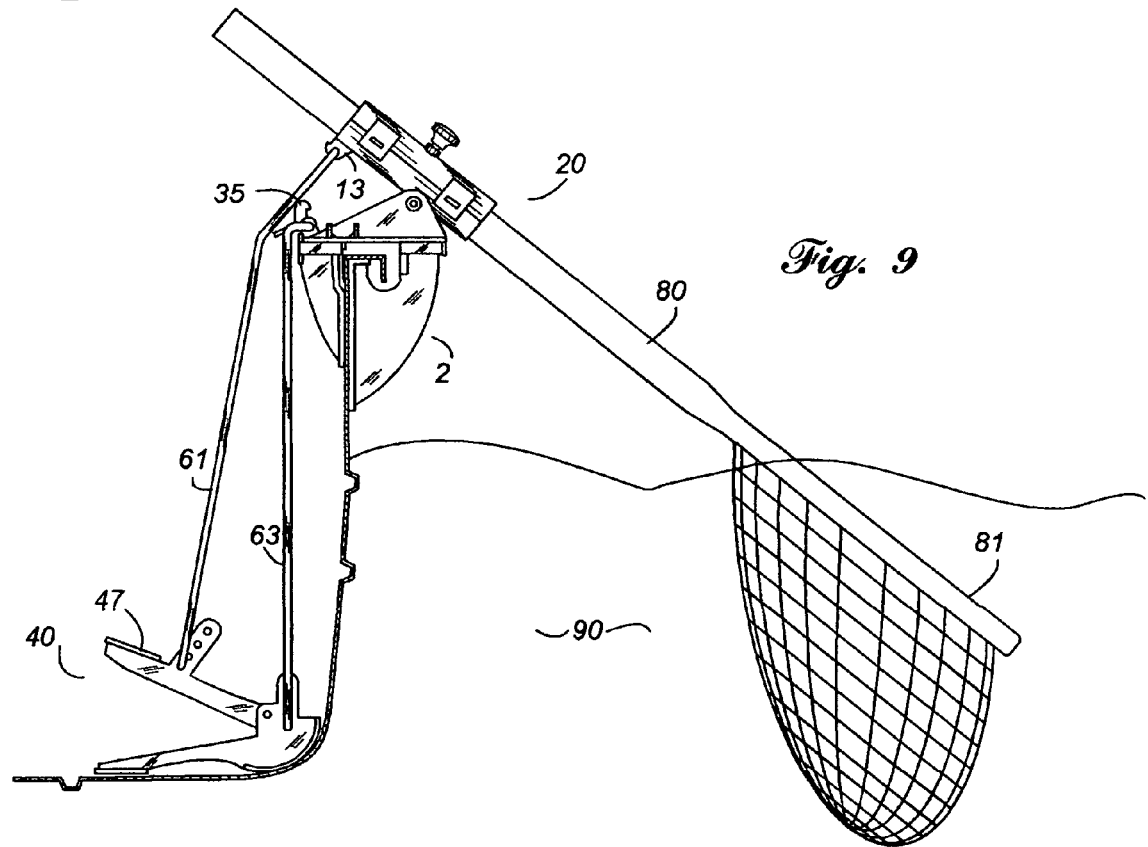

FOOT OPERATED FISHING NET TIPPER

FIELD OF THE INVENTION

The present invention relates to a foot operated fishing net tipping apparatus releasably attached to a fishing boat comprising: a boat-attaching portion, a net-holding portion, a lock portion, a foot pedal portion and connecting members. A fisherman can raise and lower a fishing net with one foot, thereby freeing both hands for the fishing rod.

BACKGROUND OF THE INVENTION

In fishing, especially from a conventional fishing boat, it is common for fishermen to help one another in bringing a caught fish into the boat by having one person handle the fishing line and another person using a net to secure the catch. On a good day fishing, when two fishermen have a fish on, it becomes virtually impossible to help each other in the above fashion.

It became apparent to the inventor to devise an apparatus that would use one's foot to operate a fishing net from a conventional fishing boat.

Prior art teaches of no such apparatus that enables a boat fisherman to operate a fishing net with a foot pedal.

SUMMARY OF THE INVENTION

It is thus the object of the present invention to provide boat fishermen with a foot operated fishing net tipper designed to free a fisherman's hands while reeling in his/her catch.

In one aspect of the invention, the boat-attaching portion may be fixedly attached to a boat's upper edge.

In another aspect of the invention, the boat-attaching portion may incorporate a clamp-type device to releasably secure said boat-attaching portion.

Accordingly, the foot-operated fishing net tipper of the present invention allows a fisherman to operate a fishing net by foot while manipulating a fishing rod with both hands.

BRIEF DESCRIPTION OF THE DRAWINGS

These and other advantages of the invention will become apparent upon reading the following brief description and upon referring to the drawings in which:

FIG. 8 is a right-side elevation view of the foot operated fishing net tipper of the present invention shown attached to a boat and holding a net in a raised position.

FIG. 9 is a right-side elevation view of the foot operated fishing net tipper of the present invention shown attached to a boat and holding a net in a lowered position.

Figure 1:
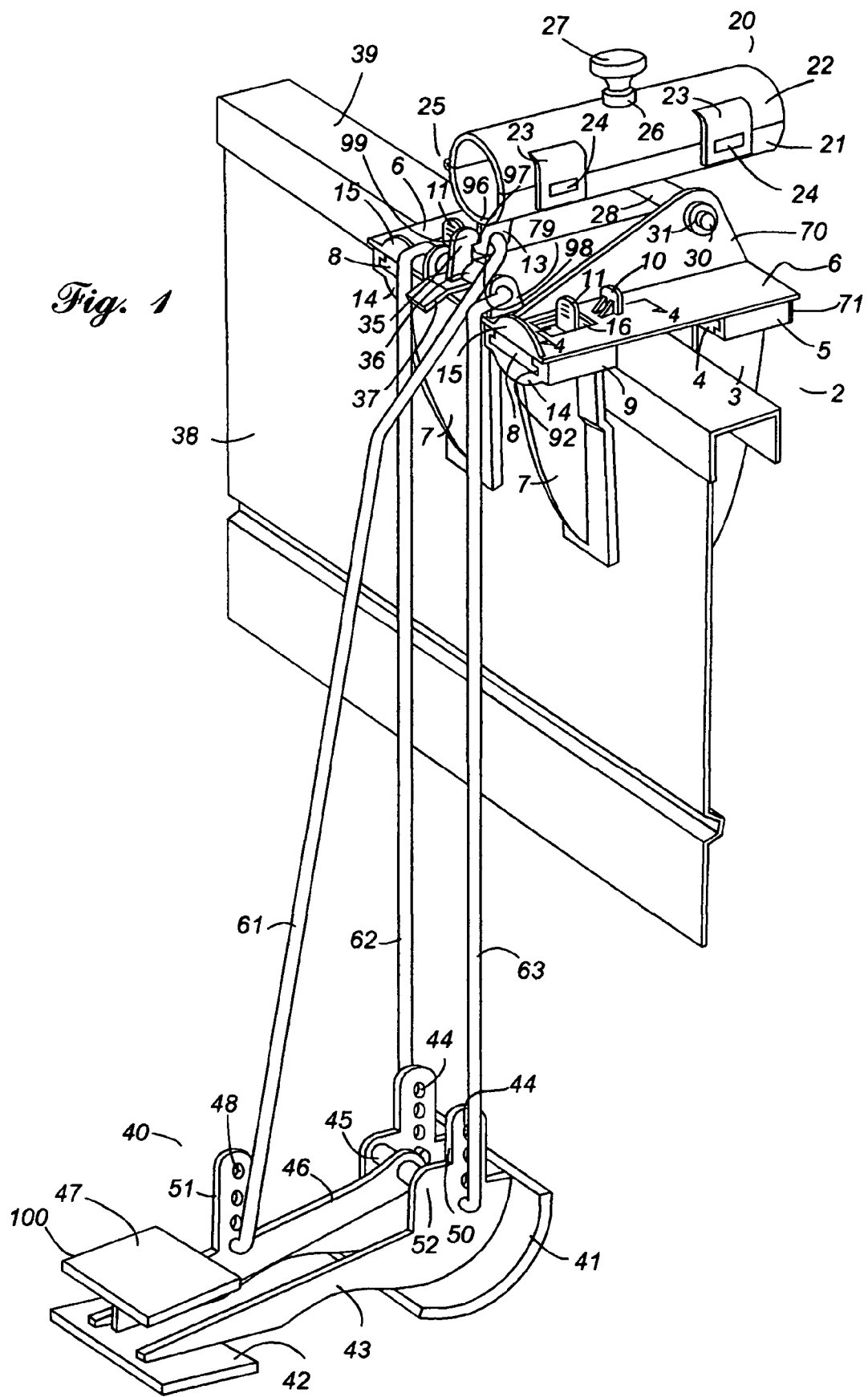
FIG. 1 is a perspective view of the foot operated fishing net tipper of the present invention shown attached to a boat's side.

While the invention is described in conjunction with preferred illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENT

In the following description, similar features in the drawings have been given similar reference numerals.

Turning to the drawings, in particular, FIG. 1, which illustrates a perspective view of the foot operated fishing net tipper of the present invention comprising: a boat-attaching portion 2 with each half being a mirror image of the other having a generally planar member 6, an outer bracket 5, an inner bracket 9, an outer clamp 3 adapted with a channel 4 to slide in a mating channel 92 within the outer bracket 5, an inner clamp 7 also having a channel 8 adapted to slide unidirectionally in a mating channel 92 within the inner bracket 9, a ratchet mechanism 93 adapted with a hinged member 11 hinged to the planar member 6 within an opening 16 where said hinge member 11 is adapted with a plurality of teeth 12 mating with a reversed pattern of teeth 17 atop the channel 8 of the inner clamp 7, a pair of upwardly projecting plates 70 integrally attached to the planar member 6 thereby forming two raised fins above said planar member 6 through which a horizontal reinforced perforation 31 is provided to rotably engage an axle 30 holding the net holding portion 20, a net-holding portion 20 having a lower 21 and an upper 22 hemi-cylindrical half forming a generally hollow tubular member, said lower half 21 is fixedly attached to an net axle housing member 28 through which an axle 30 passes, and also adapted with a hinge 25 and latch pins 24, the upper half 22 of the net holding portion 20 is adapted with a mating hinge 25, latches 23 having an opening through which the latch pins 24 of the lower half of the net holding portion 20 frictionally engage, a turn bolt 29 having a knob 27 and a threaded stem 94 protruding a similarly threaded opening at the very top of the upper half 22 of the net holding portion 20, a strike 13 located on the lower rearmost surface 96 of the lower half of the net holding portion 20 having a rearward hook portion 97 and a horizontal perforation, a lock portion 99 having a pivoting latch 35 and a lever 37 fixedly attached to an lock axle housing 36 so as to rotably with connecting members 62 and 63 where said connecting members 62 and 63 form an axle upon which the locking latch 99 rotates, connecting members 61, 62 & 63 including rear stabilizer struts 62 & 63 and a center transmission arm 61, and a foot pedal assembly 40 having a curved toe portion 41, a planar heel portion 42 joined by vertically planar joining members 43 to which upwardly protruding tongues 50 are integrally attached, a pedal 100 having an arm 46 and pedal axle housing 45 and a planar pad 47 and an upwardly protruding tongue 51 all integrally attached to said arm 46 by an axle 52 traversing perforations at each joining member 50.

Figure 2:
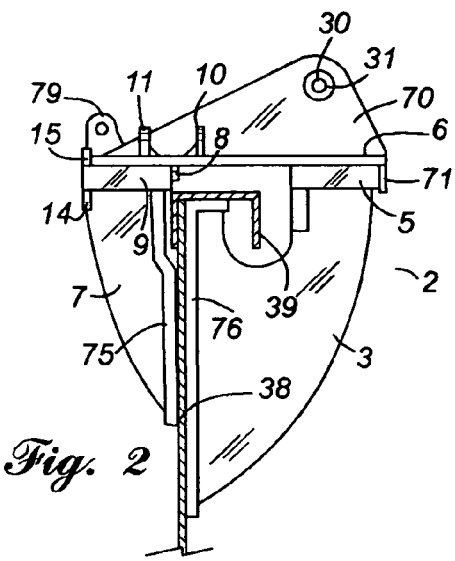
FIG. 2 is a cross-sectional view taken from FIG. 1 of the boat-attaching portion of the foot operated fishing net tipper of the present invention shown clamped to a boat's side.

Turning now to FIG. 2, a cross sectional view taken from FIG. 1 of the boat-attaching portion 2 of the foot operated fishing net tipper of the present invention illustrating a partial section of a boat's side adapted with the boat-attaching portion 2 comprising: an outer clamp 3 slidably connected to the outer channel portion 5 of the planar base 6 where a widened member 76 contacts the outer surface of the boat's side 38 just under the boat's upper lip 39, and an inner clamp portion 7 ratchetedly attached to the inner channel member 9 of the planar base 6.

Figure 4:
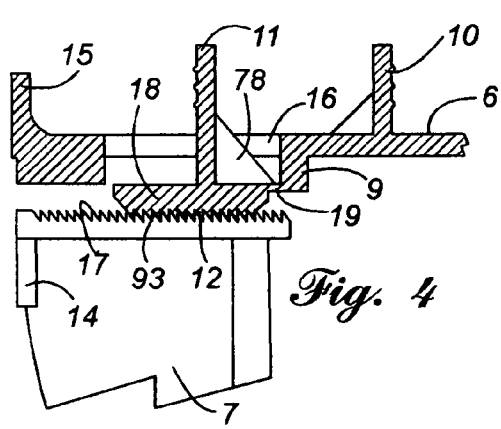
FIG. 4 is a cross-sectional view taken from FIG. 1 of the locking latch portion of the foot operated fishing net tipper of the present invention shown with the latch engaged.

Turning now to FIG. 4, further illustrating the ratchet mechanism 93 comprising: an inner clamp member 7 slidably engaged within a channel 9 fixedly attached to a planar base 6, and a hinged ratchet latch 18 floating above a mating ratchet surface 17 thereby promoting a solid grip between the ratcheted lower clamp surface and the similarly ratcheted surface 12 of the hinged ratchet latch 18. The connection can be disengaged by squeezing the handle 11 and 10 together thereby lifting the hinged ratchet latch 18 away from the ratcheted upper surface of the inner clamp member 7.

In reference now again to FIG. 2, it can be further understood how when the inner clamp member is pushed outwardly against the inner surface of the boat's side with the lower grip 14 while pulling the planar surface 6 inwardly with the upper grip 15, a clamp-like pressure is exerted on both inner and outer surfaces of the boat's side.

Figure 3:
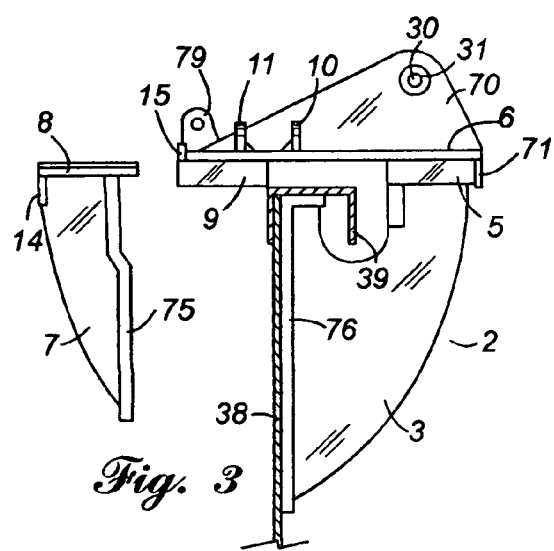
FIG. 3 is a cross-sectional view taken from FIG. 1 of the boat-attaching portion of the foot operated fishing net tipper of the present invention shown unclamped from a boat's side.

Turning now to FIG. 3, illustrating the initial set-up of the boat-attaching portion 2. The inner clamp member 7 is then inserted within an inner channel within the channel member 9 to engage the ratchet latch.

Figure 5:
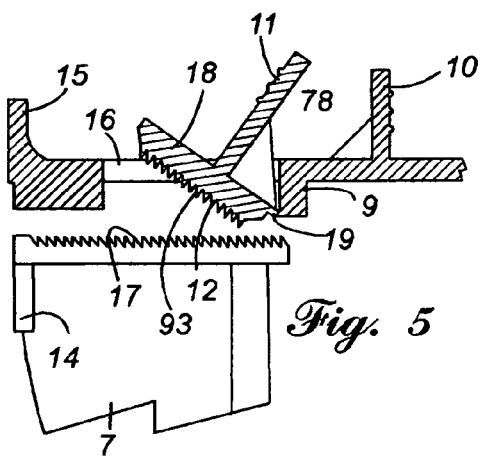
FIG. 5 is a cross-sectional view taken from FIG. 1 of the locking latch portion of the foot operated fishing net tipper of the present invention shown with the latch disengaged.

Turning to FIG. 5, a cross-sectional view of the ratchet latch assembly in a disengaged position illustrating the freedom granted to the inner clamp member 7 thus allowing said member to be retracted inwardly away from the boat-attaching portion 2 of the present invention.

Figure 6:
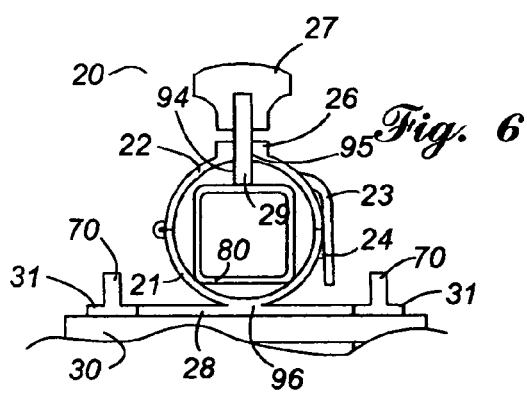
FIG. 6 is a cross-sectional view taken from FIG. 8 of the net holding portion of the foot operated fishing net tipper of the present invention shown in a net securing position.

Referring now to FIG. 6, a cross-sectional view taken from FIG. 8, illustrating the net holding portion 20 having a lower 21 and an upper 22 hemi-cylindrical half forming a generally hollow tubular member, said lower half 21 is fixedly attached to an net axle housing member 28 through which an axle 30 passes, and also adapted with a hinge 25 and latch pins 24, the upper half 22 of the net holding portion 20 is adapted with a mating hinge 25, latches 23 having a opening through which the latch pins 24 of the lower half of the net holding portion 20 frictionally engage, a turn bolt 29 having a knob 27 and a threaded stem 94 protruding a similarly threaded opening at the very top of the upper half 22 of the net holding portion 20. A net handle 80 may be placed within the hollow cylindrical form by latching the upper latch 23 with the lower latch 24 and tightening the turn bolt 29 fixedly attached to a knob 27 threaded to a reinforced portion 26 of the upper half 22 of the net attaching portion 20.

Figure 7:
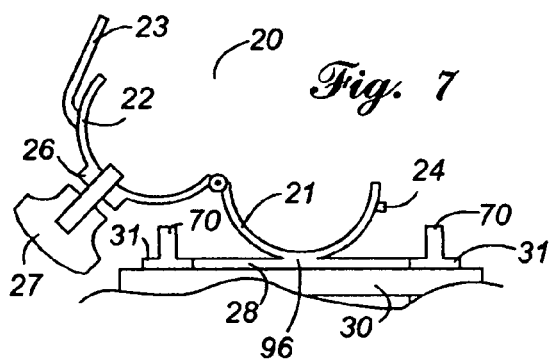
FIG. 7 is a cross-sectional view taken from FIG. 8 of the net holding portion of the foot operated fishing net tipper of the present invention shown in an opened position.

FIG. 7, also a cross-sectional view net holding portion 20 in a collapsed position illustrating the release of a quick release latch 23 from the latch 24 of the lower half of the net holding portion 20. When a fish is captured in the net 80, the fisherman's hands are now freed to quickly manipulate the net 80. Removing the net is accomplished quickly by pulling the upper latches 23 upwardly, releasing said latches from the lower latches 24 thereby allowing rotation of the upper half 21 of the net holding portion 20 thus freeing said net 80.

Turning now to FIGS. 8 & 9, a right side elevation of the foot operated fishing net tipper of the present invention further illustrating the connecting members 61 & 63 and the pedal assembly 40 where two vertical struts 63 are formed of a rigid material such as steel and adapted to pivotally engage to grips 79 at the top portion of the planar base 6 and similarly to perforations 44 within the tongues at the top portion of the pedal joining members 43, and a transmission strut 61 is similarly engaged to a strike 13 at the lower rearmost surface 96 of the lower half 21 of the net holding portion 20 and to a perforation in a tongue 51 on the upper edge of the pedal member 46. It can be observed that when downward pressure is applied atop the pad 47 of the pedal member 46, the transmission strut thereby transfers this action to the net strike 13, which in turn rotates the net holding portion toward the inner side of the boat thereby tipping up the outer end of said net holding portion 20. Furthermore, when the net in raise, a locking assembly engages a latch 35 to a strike 13 which holds the net 80 in an upright position. To lower the net back in the water 90, the fisherman simply depresses a lever 37 integrally attached and pivotally engaged to the vertical struts 62 & 63 thus releasing the net holding portion 20 and net gravitationally.

Figure 10:
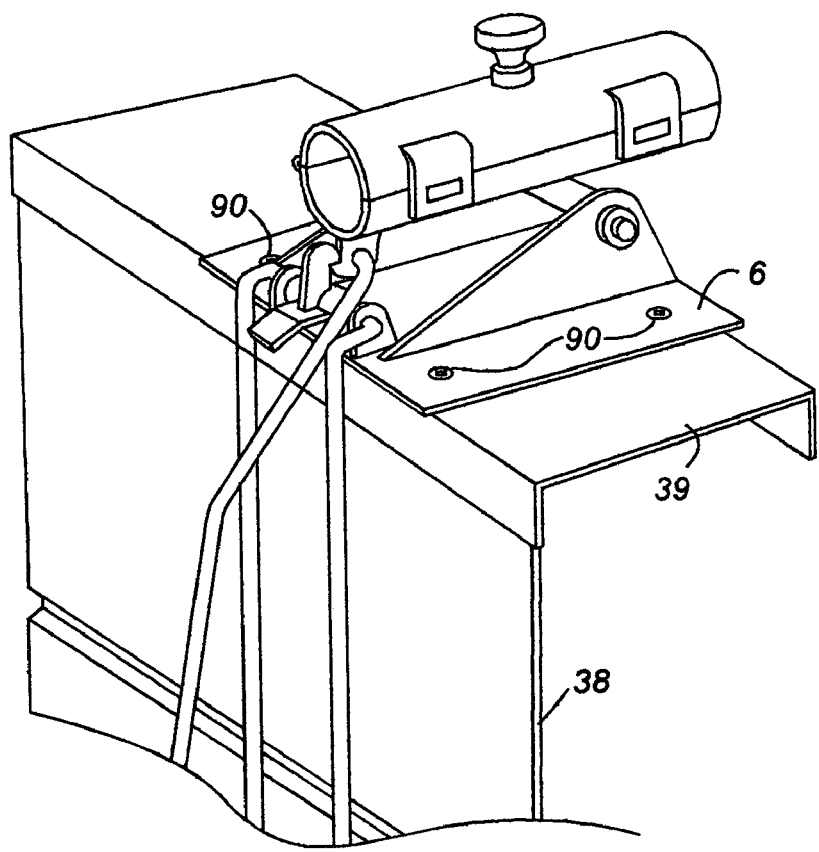
FIG. 10 is a perspective view of an alternate embodiment of the boat attaching portion of the foot operated fishing net tipper of the present invention shown attached to a boat's side.

Turning now to FIG. 10, an alternative embodiment of the boat attaching portion of the foot operated fishing net tipper of the present invention where the same tipping features are preserved when using a screw-on base 6 without clamps for those boats with a wide upper edge 39, this base 6 is fastened to the boat's upper edge 39 by means of screws 90.

What is claimed is:

1. A foot operated fishing net tipper comprising:
   a. a primary boat-attaching portion having,
      i. an outer bracket,
      ii. an inner bracket,
      iii. an outer clamp adapted with a channel to slide in a mating channel within the outer bracket,
      iv. an inner clamp also having a channel adapted to slide unidirectionally in a mating channel within the inner bracket,
      v. a ratchet mechanism adapted with a hinged member hinged to the planar member within an opening where said hinge member is adapted with a plurality of teeth mating with a reversed pattern of teeth atop the channel of the inner clamp,
      vi. a pair of upwardly projecting plates integrally attached to a planar member thereby forming two raised fins above said planar member through which a horizontal reinforced perforation is provided to rotably engage a net axle holding a net holding portion,
   b. a secondary boat-attaching portion having,
      i. a planar form having perforations therethrough to accept fasteners for attachment to a boat with wide gunwale,
      ii. a pair of upwardly projecting plates integrally attached to a planar member thereby forming two raised fins above said planar member through which a horizontal reinforced perforation is provided to rotably engage a net axle holding a net holding portion,
   c. a net-holding portion having:
      i. a lower and an upper hemi-cylindrical half forming a generally hollow tubular member where said lower half is fixedly attached to a net axle housing member through which a net axle passes and also connected with a hinge and latch pins, the upper half of the net holding portion is adapted with a mating hinge, ii. latches having a opening through which the latch pins of the lower half of the net holding portion frictionally engage,
  iii. a turn bolt having a knob and a threaded stem protruding a similarly threaded opening at the upper half of the net holding portion,
  iv. a strike located on the lower rearmost surface of the lower half of the net holding portion having a rearward hook portion, a horizontal perforation, a lock portion having a pivoting latch, and a lever fixedly attached to a net axle housing so as to rotably with connecting members where said connecting members form a net axle upon which a locking latch assembly rotates,
d. connecting members having rear stabilizer struts and a center transmission arm,
e. a foot pedal portion having:
  i. a curved toe portion,
  ii. a planar heel portion joined by vertically planar joining members to which upwardly protruding tongues are integrally attached,
  iii. a foot pedal having an arm and a pedal axle housing and a planar pad and an upwardly protruding tongue all integrally attached to said arm by a pedal axle traversing perforations at each joining member.

2. The foot operated fishing net tipper of claim 1 wherein said primary boat-attaching portion is adapted to clamp onto any small boat side top edge.

3. The foot operated fishing net tipper of claim 1 wherein the secondary boat-attaching portion comprises a planar sheet like portion incorporating the upper portions of the primary boat attaching portion and adapted to securely attach to a wide surface with suitable fasteners.

4. The foot operated fishing net tipper of claim 1 wherein the foot pedal portion is adapted with vertical members having a plurality of perforations therethrough to enable height adjustability between the boat-attaching portion and the foot pedal portion.

5. The foot operated fishing net tipper of claim 1 wherein the net-holding portion is adapted with a latch that holds said net-holding portion in a horizontal position when so desired.

6. The foot operated fishing net tipper of claim 1 wherein the two halves of the net holding portion may be quickly collapsed by means of quick release latches.

7. The foot operated fishing net tipper of claims 1, 2, 3, 4, 5 or 6 wherein the use for said foot operated fishing net tipper is to enable hands free operation of a fishing net when fishing from conventional fishing boats.

* * * * *